(12) United States Patent
Tanno et al.

(10) Patent No.: US 11,498,365 B2
(45) Date of Patent: Nov. 15, 2022

(54) PNEUMATIC TIRE

(71) Applicant: The Yokohama Rubber Co., LTD., Tokyo (JP)

(72) Inventors: Atsushi Tanno, Hiratsuka (JP); Shusaku Tomoi, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 429 days.

(21) Appl. No.: 16/620,863

(22) PCT Filed: Jun. 5, 2018

(86) PCT No.: PCT/JP2018/021523
§ 371 (c)(1),
(2) Date: Dec. 9, 2019

(87) PCT Pub. No.: WO2018/225716
PCT Pub. Date: Dec. 13, 2018

(65) Prior Publication Data
US 2020/0122518 A1   Apr. 23, 2020

(30) Foreign Application Priority Data
Jun. 9, 2017   (JP) .............................. JP2017-113910

(51) Int. Cl.
*B60C 11/13*   (2006.01)
*B60C 11/01*   (2006.01)
*B60C 11/03*   (2006.01)

(52) U.S. Cl.
CPC .......... *B60C 11/01* (2013.01); *B60C 11/1307* (2013.01); *B60C 11/1353* (2013.01);
(Continued)

(58) Field of Classification Search
CPC ............. B60C 11/1353; B60C 11/1307; B60C 2011/133; B60C 2011/1338;
(Continued)

(56) References Cited

U.S. PATENT DOCUMENTS 2,326,634 A * 8/1943 Gebhard ................. C03C 12/02
359/540
4,721,389 A   1/1988 Dejaiffe
(Continued)

FOREIGN PATENT DOCUMENTS

CA       2212021     * 7/1998
DE     30 39 037       5/1982
(Continued)

OTHER PUBLICATIONS

DE 3039037 Machine Translation; Kern, Walter (Year: 1982).*
(Continued)

*Primary Examiner* — Robert C Dye
*Assistant Examiner* — Nicholas J Weiler
(74) *Attorney, Agent, or Firm* — Thorpe North & Western

(57) ABSTRACT

Provided is a pneumatic tire with a surface provided with a reflective layer that reflects light, the reflective layer including a transparent globule group composed of transparent globules. At least some of the transparent globules are each configured to reflect incident light incident into the transparent globule from outside, at an interface with the outside of the transparent globule, and to emit the light to the outside of the transparent globule as reflected light. The transparent globules are each configured to cause the reflected light to include more amount of non-retroreflected light than retroreflected light, the non-retroreflected light moving further away from an optical path of the incident light according to a distance from the transparent globules, being increased. The transparent globules each have an optical path of the
(Continued)

non-retroreflected light with an angle difference of from 2.0 degrees to 2.5 degrees from the optical path of the incident light.

16 Claims, 12 Drawing Sheets

(52) U.S. Cl.
CPC .................. *B60C 2011/0358* (2013.01); *B60C 2011/0365* (2013.01); *B60C 2011/0372* (2013.01)

(58) Field of Classification Search
CPC ....... B60C 13/001; B60C 13/02; B60C 11/01; B60C 2011/016; B60C 2011/0358; B60C 11/13
See application file for complete search history.

(56) References Cited

U.S. PATENT DOCUMENTS

| | | | |
|---|---|---|---|
| 5,620,775 | A | 4/1997 | Laperre |
| 2003/0133193 | A1 | 7/2003 | Martines |
| 2004/0108035 | A1 | 6/2004 | Majumdar |
| 2006/0191616 | A1* | 8/2006 | Canankamp ........ B60C 11/0302 152/209.24 |
| 2009/0035520 | A1* | 2/2009 | Sagar ...................... B41F 15/10 427/199 |
| 2011/0216411 | A1 | 9/2011 | Reed |
| 2011/0216412 | A1 | 9/2011 | Reed |
| 2013/0148846 | A1 | 6/2013 | Maeda et al. |
| 2017/0050471 | A1* | 2/2017 | Shimura ............. B60C 11/1259 |
| 2017/0308749 | A1 | 10/2017 | Tanno |

FOREIGN PATENT DOCUMENTS

| | | |
|---|---|---|
| JP | S57-186702 | 11/1982 |
| JP | S61-243344 | 10/1986 |
| JP | H07-295487 | 11/1995 |
| JP | H11-514943 | 12/1999 |
| JP | 2001-048586 | 2/2001 |
| JP | 2011-058183 | 3/2011 |
| JP | 2016-097838 | 5/2016 |
| WO | WO 97/16754 | 5/1997 |
| WO | WO 2011/109666 | 9/2011 |
| WO | WO 2011/109667 | 9/2011 |
| WO | WO 2016/076242 | 5/2016 |

OTHER PUBLICATIONS

JP H07-295487 Machine Translation; Naoyuki, Takagi (Year: 1995).*
JP 2011-058183 Machine Translation; Omichi, Masaru (Year: 2011).*
International Search Report for International Application No. PCT/JP2018/021523 dated Aug. 28, 2018, 4 pages, Japan.

* cited by examiner

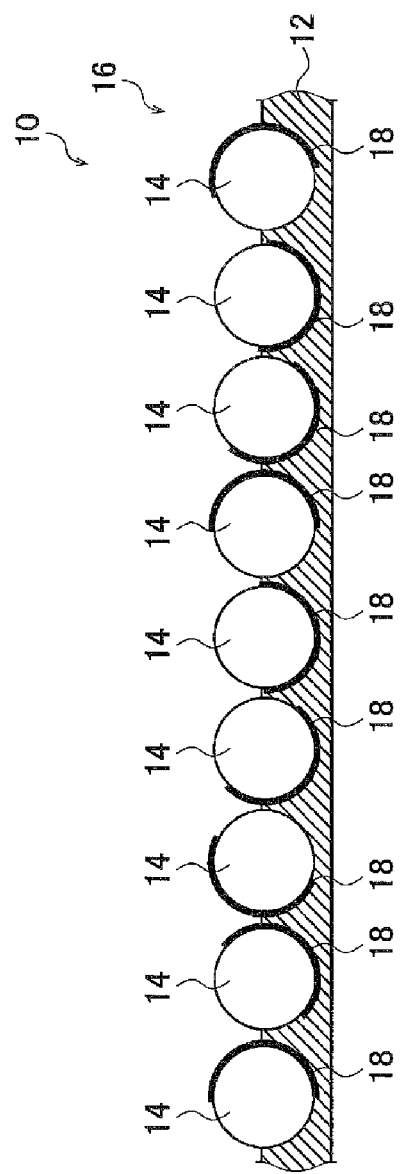
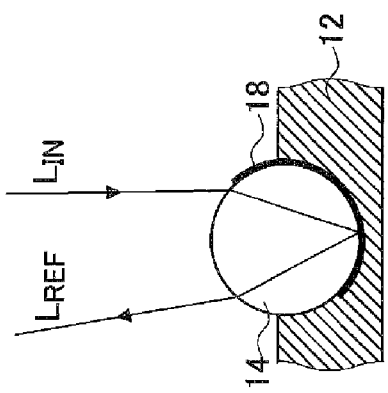
FIG. 1A
FIG. 1B

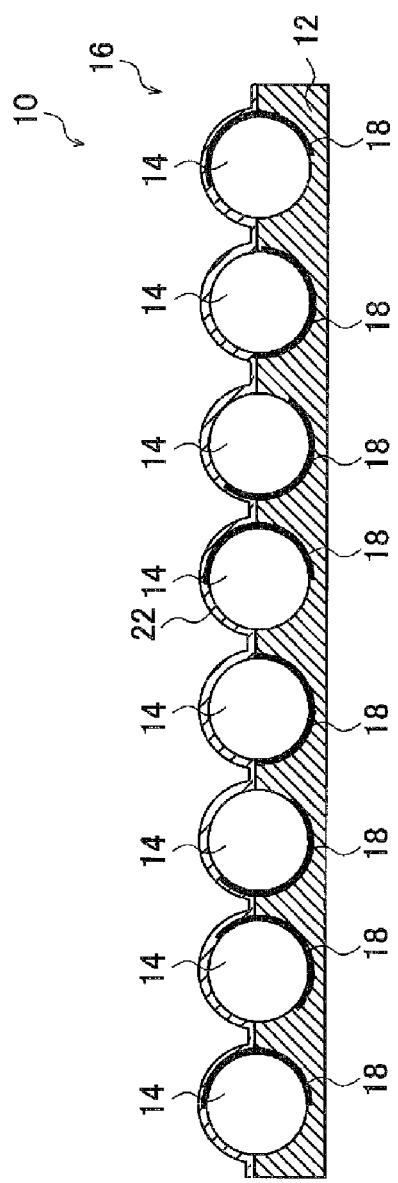

PNEUMATIC TIRE

TECHNICAL FIELD

The present technology relates to a pneumatic tire provided on its surface with a reflective layer that reflects light.

BACKGROUND ART

Currently, collision avoidance systems each mounted in a vehicle and detect a distance between the vehicle and a leading vehicle to avoid collisions between the vehicles have been practically used. In the collision avoidance systems, accurately detecting a distance between vehicles is important in terms of collision avoidance. As one of methods for detecting a distance between vehicles, a method using a camera is known. For example, left and right tail lamps or tires of a preceding vehicle are extracted from images acquired by a digital camera as feature points, and a distance between the vehicles is estimated based on a distance between the feature points.

Estimation of a distance between vehicles needs to be performed accurately even at sunny weather and rainy weather, but the estimation may decrease in accuracy at rainy weather. For example, when tail lamps of a leading vehicle are extracted as feature points to detect a distance between the vehicles, an image of the tail lamps projected on a road surface wetted due to rain may be acquired by a camera. When the distance between the vehicles is estimated based on the image of the tail lamps projected on the road surface instead of an actual image of the tail lamps, the estimation is likely to decrease in accuracy. In particular, at night in rain, the estimation of a distance between vehicles using a camera is likely to decrease in accuracy.

In response to this kind of problem, there is known a pneumatic tire that can provide improved estimation accuracy of a distance between vehicles using a camera to estimate the distance between the vehicles using an image acquired by the camera (see Japan Unexamined Patent Publication No. 2016-97838).

The pneumatic tire is provided on its surface with a self-color region including a surface of rubber, and an image recognition belt region including a colored region provided circumferentially around the center axis serving as the center of rotation of the pneumatic tire. The colored region is formed by application of a retroreflective paint, for example. The pneumatic tire is provided with the image recognition belt region including the colored region allowing image recognition with a high recognition rate. The image recognition belt region suppresses deterioration of a recognition rate of recognizing a pneumatic tire of a leading vehicle captured by a camera of a following vehicle, as a feature point for measuring a distance between the vehicles. Even when the camera acquires an image of a pneumatic tire projected on a wet road surface and a distance between the vehicles is estimated based on the acquired image, the pneumatic tire is disposed at a position closer to the road surface compared to tail lamps, and thus estimation accuracy of the distance between the vehicles is higher than estimation of the distance between vehicles based on an image of the tail lamps.

However, even when a colored region using a retroreflective paint is provided on the surface of the pneumatic tire, a recognition rate with which a collision avoidance system recognizes the pneumatic tire as a feature point is not sufficient compared to using tail lamps.

SUMMARY

The present technology provides a pneumatic tire that can provide improved estimation accuracy of a distance between vehicles in a collision avoidance system as compared to a conventional tire when the distance between vehicles is estimated using the collision avoidance system.

One aspect of the present technology is a pneumatic tire.

The pneumatic tire includes a reflective layer that is provided on a surface of the pneumatic tire that reflects light, and the reflective layer includes a transparent globule group composed of a plurality of transparent globules. At least some of the transparent globules of the transparent globule group are each configured to reflect incident light incident thereinto from outside, at an interface with the outside thereof, and to emit the light to the outside of the transparent globule as reflected light.

The transparent globules include a plurality of transparent globules A. The transparent globules A are each configured to cause the reflected light to include more amount of non-retroreflected light than retroreflected light, the non-retroreflected light being farther away from an optical path of the incident light according to a distance from the transparent globule A being increased.

The transparent globules A each have an optical path of the non-retroreflected light with an angle difference of from 2.0 degrees to 2.5 degrees from the optical path of the incident light.

Preferably, the transparent globules A each have characteristics in which a value of a mean amount of the non-retroreflected light within a range of the angle difference of from 2.0 degrees to 2.5 degrees is more than a value of an amount of the retroreflected light.

Preferably, the transparent globules A each have an opaque reflective film formed along a part of a surface of the corresponding one of the transparent globules A.

Preferably, the opaque reflective film has an area that is from 30 to 70% of a total area of the surface of each of the transparent globules A.

Preferably, an orientation of a central position of the opaque reflective film with respect to a center of each of the transparent globules A is dispersed among the transparent globules A.

Preferably, the transparent globule group includes a plurality of transparent globules B each having the angle difference less than that of each of the transparent globules A.

Preferably, a ratio of the number of the transparent globules A to a total number of the transparent globules A and the transparent globules B is from 30% to 70%.

Preferably, the reflective layer includes an opaque rubber layer that holds each of the transparent globules, and each of the transparent globules has a portion corresponding to a length that is from 20 to 60% of a diameter of each of the transparent globules, the portion projecting from the opaque rubber layer.

Preferably, the portion of each of the transparent globules, projecting from the opaque rubber layer, is covered with a transparent protective layer. Preferably, the reflective layer includes a transparent protective layer inside which the transparent globule group is distributed, and the transparent globule group includes transparent globules C each having an entirely transparent surface, the number of the transparent globules C being from 5 to 50% of a total number of transparent globules of the transparent globule group.

Preferably, the transparent globules each have a diameter of from 10 to 250 μm.

Preferably, in a profile cross section of the pneumatic tire, an inclined region is positioned outward of a tread surface in a tire lateral direction and inclined in the tire lateral direction between the tread surface and a sidewall, and that the inclined region includes an inclined surface with a gentle inclined surface that is closer to a direction parallel to the tire lateral direction than its surrounding portion, the gentle inclined surface including the reflective layer.

Preferably, the tread surface of the pneumatic tire includes lug grooves extending in the tire lateral direction, and the lug grooves each have the groove wall with an inclination angle of from 15 degrees to 55 degrees relative to a tire radial direction, the reflective layer being provided on the groove bottom and the groove wall of each of the lug grooves.

Preferably, the tread surface of the pneumatic tire includes lug grooves extending in the tire lateral direction, and the lug grooves each have a portion in an extending direction of the lug grooves, the portion having a lug groove inclination angle of from 0 to 10 degrees from the tire lateral direction, the reflective layer being provided on a groove bottom and a groove wall in the portion of each of the lug grooves.

Preferably, at least some of the transparent globules each include an opaque metallic reflective film in a part of its surface, being formed along the surface, and a tread surface of the pneumatic tire includes a plurality of lug grooves extending in the tire lateral direction, in a tire circumferential direction, a distance between centers of the lug grooves adjacent to each other in the tire circumferential direction being an integer multiple of from 1.95 to 1.96 mm, and the reflective layer being provided on a groove bottom or a groove wall of each of the lug grooves.

According to the pneumatic tire described above, estimation accuracy of a distance between vehicles in the collision avoidance system can be improved as compared to conventional tires.

BRIEF DESCRIPTION OF DRAWINGS

FIG. 1A is a diagram illustrating an example of a structure of a reflective layer provided on a pneumatic tire according to the present embodiment. FIG. 1B is a diagram illustrating an example of an optical path of each of incident light and reflected light in a transparent globule used in the reflective layer.

FIG. 5 is a diagram illustrating an example of a structure of a reflective layer in an embodiment.

DETAILED DESCRIPTION

Figure 2:
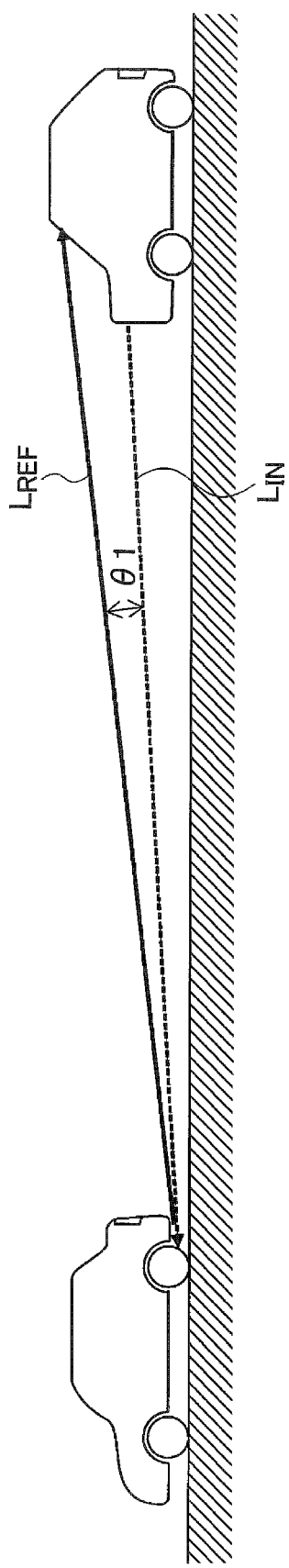
FIG. 2 is a diagram illustrating an optical path of each of incident light (illumination light) and reflected light in a collision avoidance system.

Hereinafter, a pneumatic tire according to an embodiment of the present technology will be described below in detail with reference to the accompanying drawings.

FIG. 1A is a diagram illustrating an example of a structure of a reflective layer 10 provided on a surface of a pneumatic tire according to the present embodiment. FIG. 1B is a diagram illustrating an example of an optical path of each of incident light $L_{IN}$ and reflected light $L_{REF}$ in a transparent globule used in the reflective layer 10. The reflective layer 10 reflects light incident on the reflective layer 10.

The reflective layer 10 includes an opaque rubber surface layer 12 and a transparent globule group 16 consisting of a plurality of transparent globules 14. While in FIG. 1A, the transparent globules 14 are disposed at uniform intervals in the rubber surface layer 12, the transparent globules 14 may be disposed at random intervals.

The rubber surface layer 12 covers a part of each of the transparent globules 14 so as to support the part of each of the transparent globules 14.

As illustrated in FIG. 1B, the transparent globule group 16 includes the transparent globule 14 configured to reflect incident light $L_{IN}$ incident into the each transparent globule 14 from outside, at an interface with the outside of the transparent globule 14, and to emit the light to the outside of the transparent globule 14 as reflected light $L_{REF}$. The transparent globules 14 are made of resin or glass, for example.

The transparent globule group 16 includes a transparent globule A. The transparent globule A is configured to cause the reflected light $L_{REF}$ to include more amount of non-retroreflected light travelling through an optical path in non-parallel to the optical path of incident light $L_{IN}$ than retroreflected light emitted in a direction parallel to the optical path of incident light $L_{IN}$, the non-retroreflected light being farther away from an optical path of incident light $L_{IN}$ according to a distance from the transparent globule 14 being increased.

The fact that the reflected light $L_{REF}$ includes more amount of non-retroreflected light than retroreflected light means that specifically, in distribution of the amount (luminous flux) of the reflected light $L_{REF}$ in accordance with an angle difference between the optical path of the incident light $L_{IN}$ and the optical path of the reflected light $L_{REF}$, the amount (luminous flux) of the non-retroreflected light is more than the amount (luminous flux) of the retroreflected light emitted in a direction parallel to the optical path of the incident light $L_{IN}$. Preferably, the fact means that in the distribution of the amount (luminous flux) of the reflected light $L_{REF}$ in accordance with an angle difference between the optical path of the incident light $L_{IN}$ and the optical path of the reflected light $L_{REF}$, the transparent globule A includes a portion where a value of the amount of retroreflected light is more than a value of the amount of light with an angle difference of zero. Here, the optical path of each of the incident light $L_{IN}$ and the reflected light $L_{REF}$ refers to the optical axis of the luminous flux. The transparent globule A is configured such that an angle difference between the optical path of non-retroreflected light and the optical path of the incident light $L_{IN}$ is within a range of from 2.0 degrees to 2.5 degrees. The angle difference described above can be achieved by adjusting a refractive index of the transparent globule 14. In this case, preferably, in the distribution of the amount (luminous flux) of the reflected light $L_{REF}$ in accordance with the angle difference between the optical path of the incident light $L_{IN}$ and the optical path of the reflected light $L_{REF}$, a value of a mean amount of light including non-retroreflective light with an angle difference within a range of from 2.0 degrees to 2.5 degrees (a value acquired by dividing a total amount of light within a range of from 2.0 degrees to 2.5 degrees by 0.5 degrees), i.e., the amount of light per unit angle within the range of from 2.0 degrees to 2.5 degrees, is more than a value of the amount of retroreflected light (an angle difference of zero).

The angle difference is provided as described above because as illustrated in FIG. 2, an optical path of reflected light $L_{REF}$ of a pneumatic tire of a leading vehicle toward a camera of a following vehicle in a collision avoidance system, and an optical path of illumination light (incident light $L_{IN}$) emitted from the following vehicle to illuminate the pneumatic tire of the leading vehicle, are not parallel to each other and have an observation angle θ1. FIG. 2 is a diagram illustrating the optical path of the illumination light (incident light $L_{IN}$) and the reflected light $L_{REF}$ in the collision avoidance system.

In the collision avoidance system, it is important to recognize the pneumatic tire of the leading vehicle at an inter-vehicle distance of from 20 to 100 m. For example, θ1 is approximately 0.5 degrees at the inter-vehicle distance of 100 m, θ1 is approximately 0.8 degrees at the inter-vehicle distance of 60 m, and θ1 is approximately 2.5 degrees at the inter-vehicle distance of 20 m. In particular, it is important that high image recognition of the pneumatic tire is required at the inter-vehicle distance of 20 m for avoiding collision. At the inter-vehicle distance described above, image recognition of a pneumatic tire is low with a reflective layer using conventional retroreflective characteristics. Here, "image recognition" refers to recognizing a pneumatic tire by analyzing a structure of an image of a pneumatic tire acquired by a camera to extract a feature point. A recognition ratio for defining superiority of image recognition refers to a value indicated by "(a total number of images—the number of recognition errors)/the total number of images" when a camera acquires a plurality of images of a pneumatic tire. The image recognition includes processing such as extraction of features in the image and correspondence between the features and the pneumatic tire (pattern matching).

Thus, in consideration of the observation angle θ1, the transparent globule group 16 includes the transparent globule A configured such that an angle difference between the optical path of the reflected light $L_{REF}$, serving as non-retroreflective light, and the optical path of the incident $L_{IN}$, is from 2.0 degrees to 2.5 degrees.

The angle difference may be within a range of from 1.0 to 1.5 degrees, or may be within a range of from 2.5 to 3.0 degrees.

It is important for the transparent globule group 16 to increase the image recognition of a pneumatic tire at an inter-vehicle distance of from 60 to 100 m to avoid collision, so that preferably, according to an embodiment, another kind of transparent globule having an angle difference within a range of from 0.5 degrees to 0.8 degrees is provided corresponding to the observation angle θ1. In this case, the angle difference may be within a range of from 0.2 to 0.5 degrees or may be within a range of from 0.8 to 1.0 degrees.

Figure 3:
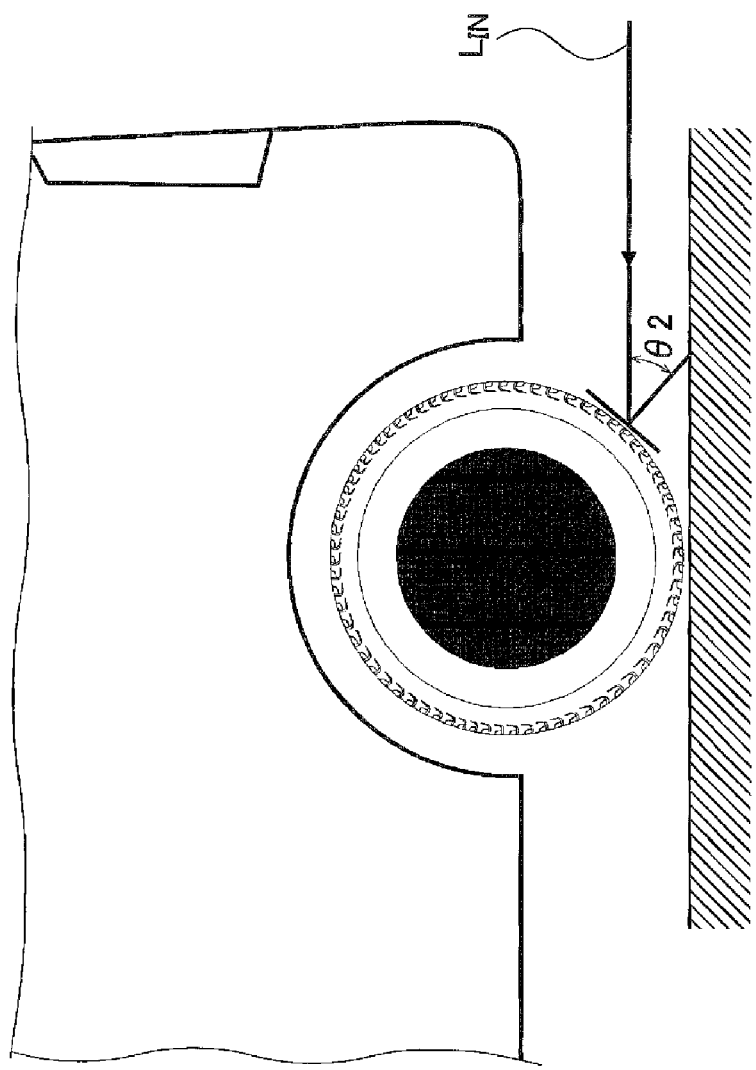
FIG. 3 is a diagram illustrating an incident angle θ2 of incident light incident on a pneumatic tire of a leading vehicle.

Measurement of an angle difference of the reflected light $L_{REF}$ and distribution of the amount of the reflected light $L_{REF}$, with respect to the incident light $L_{IN}$, is performed in accordance with JIS Z9117. Here, preferably, the measurement is performed at an incident angle of 40 degrees of the incident light $L_{IN}$ on the reflective layer 10. FIG. 3 is a diagram illustrating an incident angle θ2 of incident light $L_{IN}$ incident on a pneumatic tire of a leading vehicle. In FIG. 3, preferably, the incident angle at the time of measurement is set to 40 degrees because the incident light $L_{IN}$ at an incident angle θ2 of about 40 degrees is dominantly reflected regardless of a magnitude of the inter-vehicle distance.

Accordingly, the reflective layer 10 provides reflection that is the most easily recognizable in a typical positional relationship between a pneumatic tire of a leading vehicle and a camera of a following vehicle. The reflective layer 10 is preferably provided in a non-grounded portion in a tire surface, which is not brought into contact with a road surface. Here, the "non-ground portion" refers to a surface region of a pneumatic tire, which is not brought into contact with a road surface, when the pneumatic tire is mounted on a regular rim, inflated to the regular internal pressure, and grounded on the road surface under regular load. In particular, when a road surface is dry at night, the non-ground portion of a pneumatic tire of a leading vehicle reflects light emitted from a headlight of a following vehicle to improve the visibility of the pneumatic tire.

"Regular rim" is a rim defined by a standard for each pneumatic tire according to a system of standards that includes standards on which pneumatic tires are based, and refers to a "standard rim" in the case of JATMA (The Japan Automobile Tyre Manufacturers Association, Inc.), refers to a "design rim" in the case of TRA (The Tire & Rim Association, Inc.), and refers to a "measuring rim" in the case of ETRTO (The European Tyre and Rim Technical Organisation). However, when a pneumatic tire is an original equipment tire, the genuine wheel on which the tire is to be mounted is used.

"Regular internal pressure" is an air pressure defined by standards for each pneumatic tire according to a system of standards that includes standards on which pneumatic tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, when a pneumatic tire is an original equipment tire, the air pressure indicated on the vehicle is used.

"Regular load" is a load defined by a standard for each pneumatic tire according to a system of standards that includes standards on which pneumatic tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a pneumatic tire on a passenger vehicle. When a pneumatic tire is an original equipment tire, a wheel load is obtained by dividing the front and rear axle loads stated in the vehicle inspection certificate of the vehicle by the number of tires.

According to an embodiment, preferably, a coefficient of reflection corresponding to a coefficient of retroreflection at JIS Z9117 is 0.03 cd/lx/m$^2$ or greater under conditions where an incident angle on the reflective layer 10 is 40 degrees and an angle difference is 2.5 degrees, the coefficient of reflection being measured by the same method as the method for measuring a coefficient of retroreflection at JIS Z9117. According to an embodiment, preferably, the coefficient of reflection described above is 0.05 cd/lx/m² or greater.

According to an embodiment, as illustrated in FIGS. 1A and 1B, preferably, the transparent globules 14 each include an opaque reflective film 18 formed along a part of a surface of the corresponding one of the transparent globules 14. When the transparent globules 14 are in direct contact with the rubber surface layer 12, there is little reflection at the interface between the transparent globules 14 and the rubber surface layer 12, and thus reflected light $L_{REF}$ with a desired intensity cannot be obtained. According to an embodiment, preferably, the opaque reflective film 18 is a metallic reflective film in terms of improving reflection efficiency. Preferably, the metallic reflective film has a reflectance of from 95 to 100%, and the metallic reflective film is a metal vapor deposition film, for example. Examples of metal used for the metallic reflective film include gold, silver, iron, aluminum, titanium, chromium, nickel, and cobalt.

According to an embodiment, preferably, the opaque reflective film 18 has an area of from 30 to 70% of a total area of the surface of each of the transparent globules 14. This enables a number of the transparent globules 14 each to produce reflected light $L_{REF}$ and to increase intensity of the reflected light $L_{REF}$. When the opaque reflective film 18 has an area of less than 30% or greater than 70% of the total area of the surface of each of the transparent globules 14, it is difficult to produce reflected light $L_{REF}$ in a number of the transparent globules 14. More preferably, the opaque reflective film 18 has an area of from 40 to 60% of the total area of the surface of each of the transparent globules 14.

According to an embodiment, preferably, an orientation of a central position of the opaque reflective film 18 with respect to a center of each of the transparent globules 14 is dispersed among the transparent globules 14. For example, random dispersion is preferable. Illumination light (incident light $L_{IN}$) illuminating a surface of a pneumatic tire of a leading vehicle from a following vehicle is inclined greatly from the normal direction of the surface of the tire, and an incident angle of the illumination light also changes depending on an incident position. Thus, preferably, the orientation of the center position of the opaque reflective film 18 is dispersed among the transparent globules 14.

Figure 4:
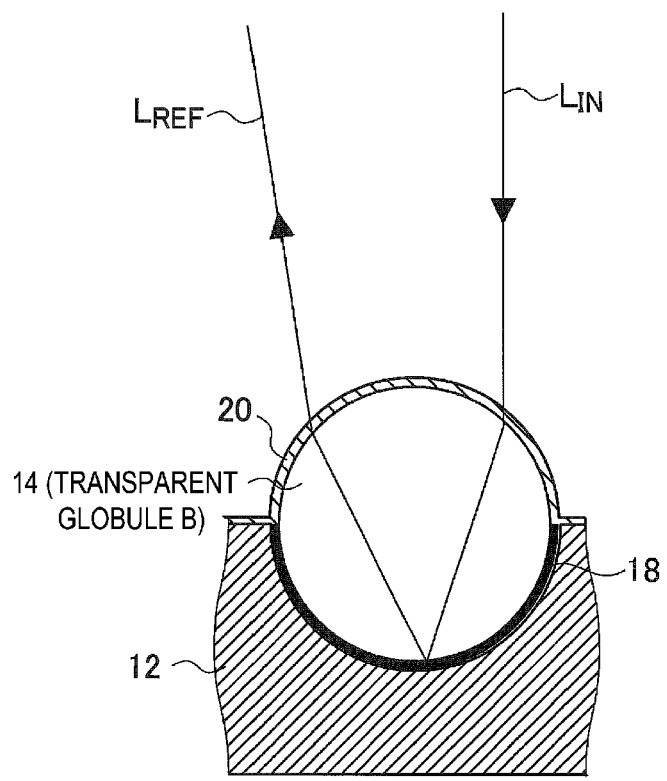
FIG. 4 is a diagram illustrating reflected light when a water film adheres to a reflective layer in an embodiment.

According to an embodiment, preferably, the transparent globule group 16 includes a plurality of transparent globules B each having an angle difference between the optical path of reflected light $L_{REF}$ and the optical path of incident light $L_{IN}$, less than that of each of the transparent globules A. During traveling in a rainy weather, a water film may adhere to a surface of the reflective layer 10 of a pneumatic tire. In this case, the angle difference changes in accordance with a refractive index of the water film. When a water film adheres to each of the transparent globules 14, the angle difference becomes too large due to the refractive index of water. Thus, it is difficult to obtain the desired observation angle θ1 illustrated in FIG. 2. For this reason, the plurality of transparent globules B each having a smaller angle difference than the transparent globules A is preliminarily used to enable the desired observation angle θ1 to be achieved even when a water film 20 adheres to the surface of the reflective layer 10 as illustrated in FIG. 4. Preferably, the angle difference in each of the transparent globules B (angle difference without a water film) is within a range of from more than 0.5 degrees to 1.5 degrees, for example.

As with the transparent globule A, the transparent globule B is also configured to cause the reflected light $L_{REF}$ to include non-retroreflected light, traveling through an optical path that is more separate from an optical path of incident light $L_{IN}$ with distance from the transparent globule 14 and that is non-parallel to the optical path of incident light $L_{IN}$, the non-retroreflected light having intensity more than that of retroreflected light emitted in a direction parallel to the optical path of incident light $L_{IN}$. The angle difference described above can be achieved by adjusting a refractive index of the transparent globule B. According to an embodiment, preferably, the transparent globule B illustrated in FIG. 4 also includes the opaque reflective film 18 formed along a part of a surface of the transparent globule B, as with the transparent globule A. FIG. 4 is a diagram illustrating reflected light when the water film 20 adheres to the reflective layer 10.

According to an embodiment, preferably, a ratio of the number of the transparent globules A to a total number of the transparent globules A and the transparent globules B is from 30% to 70%. This enables suppressing deterioration in recognition rate of a pneumatic tire regardless of adhesion of the water film 20 to the reflective layer 10. When the ratio of the number of the transparent globules A to a total number of the transparent globules A and the transparent globules B exceeds the range described above, effect of any one of the cases where the water film 20 adheres and where the water film 20 does not adhere is likely to be substantially lost.

According to an embodiment, preferably, the reflective layer 10 includes a rubber surface layer 12 that holds the transparent globules 14, and that each of the transparent globules 14 has a portion corresponding to a length of from 20 to 60% of a diameter of the corresponding one of the transparent globules 14, projecting from the rubber surface layer 12. In a pneumatic tire that greatly deforms, water is likely to enter the interface between a surface of the tire and the transparent globules 14 to cause the transparent globules 14 to fall off, and thus the transparent globules 14 need to be securely held in the rubber surface layer 12. In contrast, when the transparent globules 14 each does not project to some extent from the rubber surface layer 12, the incident light $L_{IN}$ incident into each of the transparent globules 14 decreases. Thus, preferably, each of the transparent globules 14 has a projecting portion of from 20 to 60% of its diameter.

According to an embodiment, preferably, the portion protruding from the rubber surface layer 12 of each of the transparent globules 14 is covered with a transparent protective layer 22 to prevent the transparent globules 14 projecting from the rubber surface layer 12 from falling off from the rubber surface layer 12. FIG. 5 is a diagram illustrating an example of the reflective layer 10 of the embodiment configured as described above. In this case, preferably, the transparent protective layer 22 is made of a transparent material having a refractive index preventing an angle difference between the optical path of the reflected light $L_{REF}$ and the optical path of the incident light $L_{IN}$ from being out of the range of the desired observation angle θ1. The transparent protective layer 22 may be made of a transparent elastomer, for example.

Examples of the transparent elastomer include at least one kind selected from the group consisting of styrene-butadiene rubber, butadiene rubber, isoprene rubber, butyl rubber, nitrile rubber, ethylene propylene rubber, urethane rubber, and silicone rubber.

The transparent protective layer 22 has a thickness of from 10 to 200 μm, for example. When having a thickness of less than 10 μm, the transparent protective layer 22 is likely to be broken by a popping stone or the like. The transparent protective layer 22 having a thickness of more than 200 μm is not preferable because its reflection characteristics change greatly. Preferably, the transparent protective layer 22 has a thickness of from 20 to 150 μm.

While the transparent protective layer 22 may have asperities along a spherical surface shape of the projecting portion of each of the transparent globules 14 projecting from the rubber surface layer 12, the transparent protective layer 22 may have a planar outermost surface covering the whole of the spherical surface shape of the projecting portion of each of the transparent globules 14. In other words, the reflective layer 10 may include the transparent protective layer 22 in which the transparent globule group 16 is distributed. In this case, when the transparent protective layer 22 is increased in thickness in its depth direction, the transparent globules 14 can be distributed in the depth direction. Thus, unlike the embodiments illustrated in FIGS. 1A, 1B, and 5, each of the transparent globules 14 does not need to be partially held in the rubber surface layer 12, and can be distributed inside the transparent protective layer 22. In this case, preferably, the transparent globules 14 include transparent globules C each having a surface that is transparent throughout the surface, and that the number of the transparent globules C is 5 to 50% of the total number of the transparent globules of the transparent globule group. The transparent globules C have a function of diffusing incident light $L_{IN}$ incident on the reflective layer 10 inside the transparent protective layer 22. From diffused light produced by the function, a large amount of reflected light $L_{REF}$ having the observation angle θ1 as illustrated in FIG. 2 can be produced. Thus, an effect of the diffused light produced by the transparent globules C enables ensuring a stable recognition rate of the pneumatic tire.

According to an embodiment, preferably, the transparent globules 14 each have a diameter of from 10 to 250 μm. When the transparent globule 14 has a diameter of less than 10 μm, desired reflection characteristics are not effectively obtained. When the transparent globule 14 has a diameter of more than 250 μm, adhesion of the interface with the outside of the transparent globule 14 is likely to deteriorate due to aging. The transparent globules 14 each have preferably a diameter of from 20 to 180 μm, more preferably a diameter of from 30 to 100 μm, and most preferably a diameter of from 40 to 80 μm.

Figure 6B:
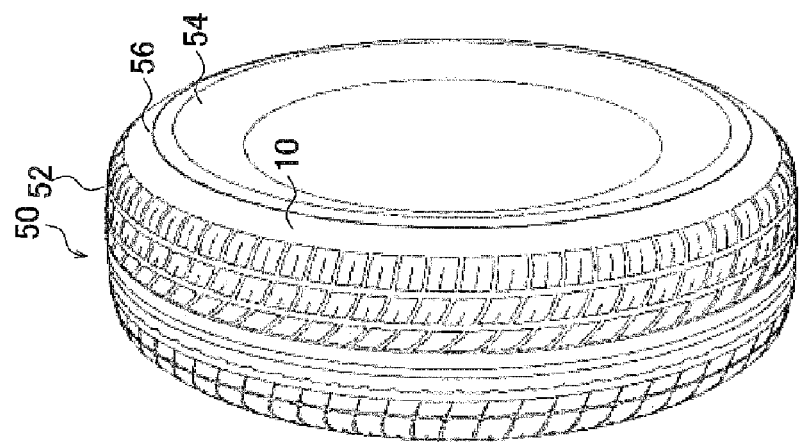
FIGS. 6A and 6B are each a diagram illustrating an example of a pneumatic tire provided with a reflective layer in an embodiment.
Figure 6A:
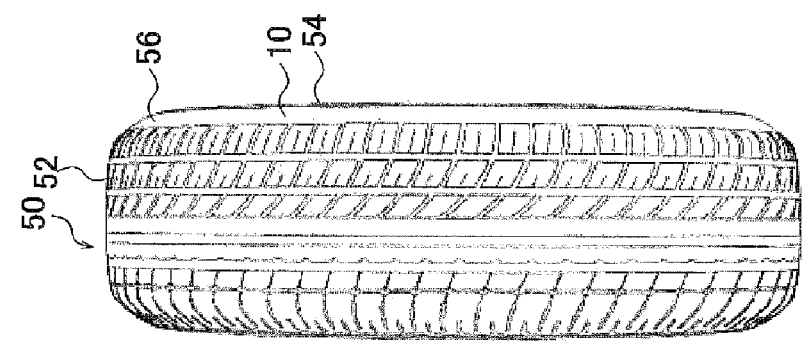

The reflective layer 10 as described above is provided on a surface of a pneumatic tire. FIGS. 6A and 6B are each a diagram illustrating an example of a pneumatic tire 50 provided with the reflective layer 10. While the pneumatic tire 50 has a tread surface 52 including a plurality of circumferential grooves extending in the tire circumferential direction, lug grooves extending from the corresponding circumferential grooves, and the like, this tread pattern is an example and the tread surface 52 is not limited to this tread pattern.

Figure 7:
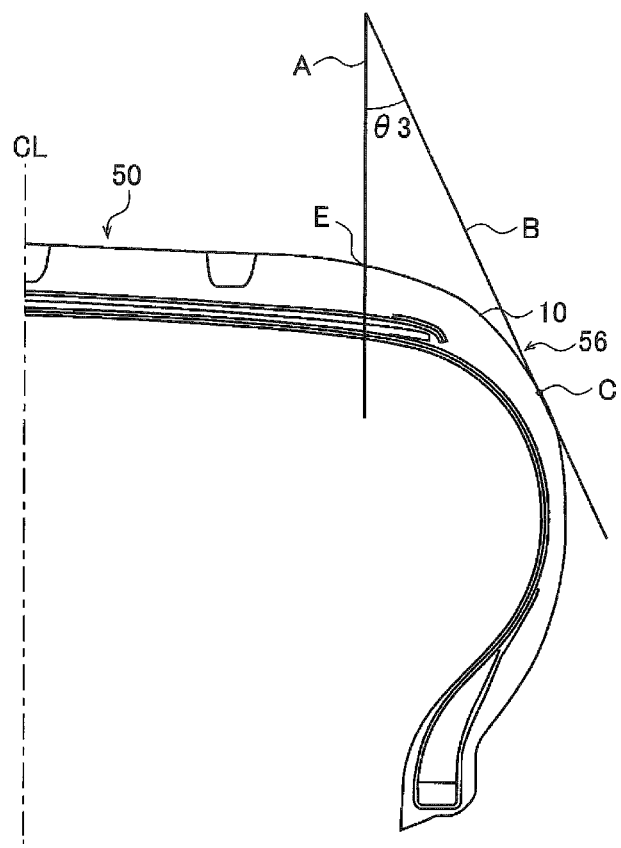
FIG. 7 is a diagram illustrating an inclined region provided with a reflective layer in an embodiment.

According to an embodiment, preferably, in a profile cross section of the pneumatic tire 50, the reflective layer 10 is provided in an inclined region (buttress region) 56 that is positioned outward of the tread surface 52 in the tire lateral direction and inclined in the tire lateral direction between the tread surface 52 and a sidewall 54. FIG. 7 is a diagram illustrating a range of the inclined region 56 in a preferred embodiment. According to an embodiment, when an angle θ3 formed between a straight line A extending along the tire radial direction from a ground contact edge E at which a ground contact portion of the pneumatic tire 50 abutting a non-ground contact portion thereof, and a tangent line B touching the inclined region 56, is within a predetermined range, a region between the ground contact edge E and a contact point C of the tangent line B serves as the inclined region 56. Here, the angle θ3 is preferably within a range of from 25 degrees to 45 degrees, and more preferably within a range of from 30 degrees to 45 degrees. Providing the reflective layer 10 in the inclined region 56 limited to the range above enables improving a recognition rate of the pneumatic tire 50 of a leading vehicle, captured by a camera of a following vehicle, used for estimating a distance between the vehicles.

Figure 8C:
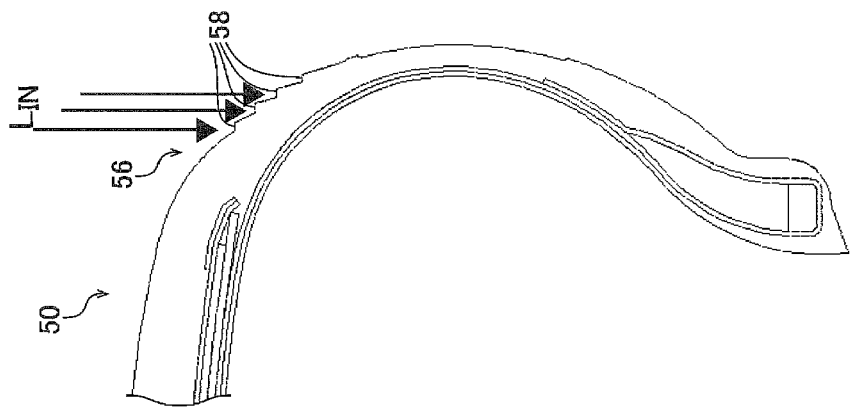
FIGS. 8A to 8C are each a diagram illustrating a placement of a reflective layer in an embodiment.
Figure 8B:
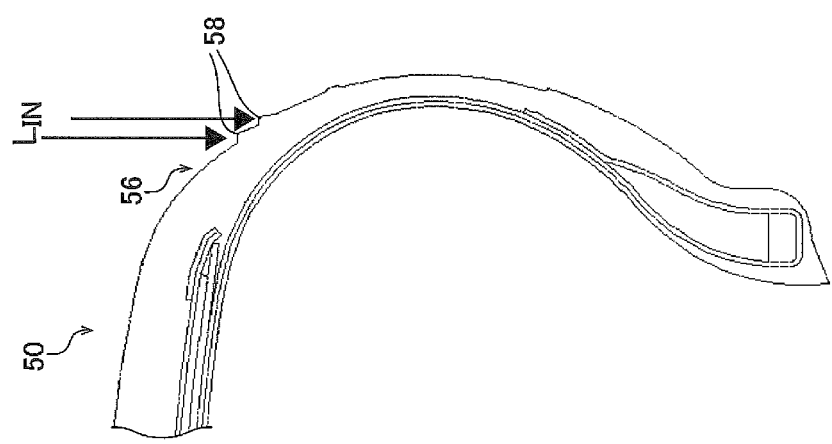
Figure 8A:
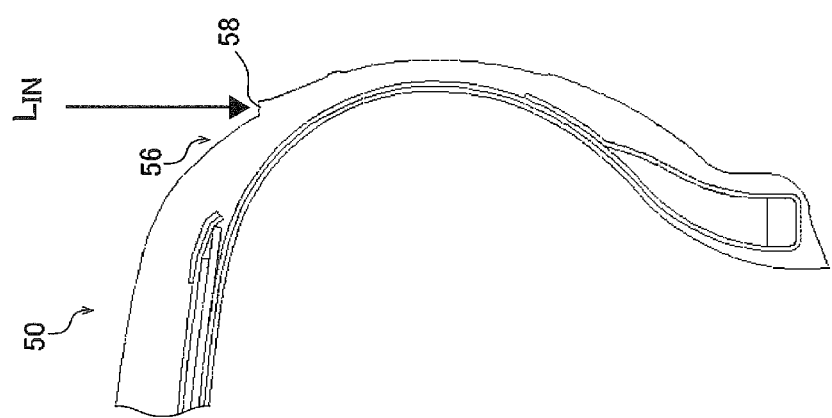

FIGS. 8A to 8C are each a diagram illustrating a placement of a reflective layer 10 in a more preferable embodiment. According to the embodiment, the inclined region 56 defined by the angle θ3 described above includes an inclined surface with a gentle inclined surface 58 that is closer to a direction parallel to the tire lateral direction than its surrounding portion. In this case, preferably, the reflective layer 10 is provided on the gentle inclined surface 58. The gentle inclined surface 58 faces having a normal line direction with respect to an inclined surface therearound, facing radially outward, so that reflected light reflected laterally outward can be reduced. Thus, the reflection characteristics of the reflective layer 10 due to the angle difference θ1 can be efficiently exhibited. This enables improving a recognition rate of the pneumatic tire 50 of a leading vehicle, captured by a camera of a following vehicle, used for estimating a distance between the vehicles. As illustrated in FIGS. 8A to 8C, while only one gentle inclined surface 58 may be provided on the pneumatic tire 50, the number of gentle inclined surfaces 58 may be two, three, four, or five or more.

Figure 9:
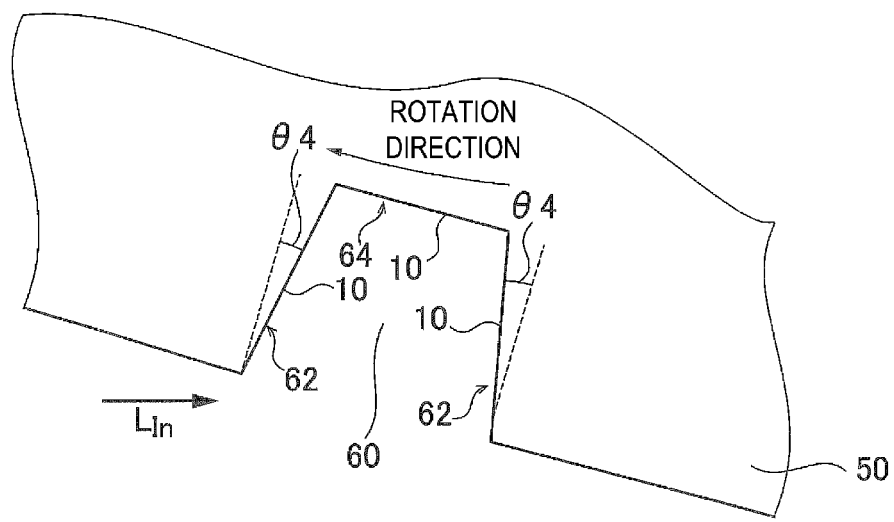
FIG. 9 is a diagram illustrating a placement of a reflective layer in another embodiment.

FIG. 9 is a diagram illustrating a placement of the reflective layer 10 in another preferred embodiment. According to the embodiment, the pneumatic tire 50 has a tread surface including a lug groove 60 extending in the tire lateral direction. The lug groove 60 includes side walls 62 each inclined from the tire radial direction at a groove wall inclination angle θ4 of from 15 degrees to 55 degrees. At this time, the reflective layer 10 is provided on each of a groove bottom 64 and the side walls 62 of the lug groove 60. When the reflective layer 10 is provided on each of the groove bottom 64 and the side walls 62 of the lug groove 60 with the groove wall inclination angle θ4 of from 15 degrees to 55 degrees, the groove bottom 64 or each of the side walls 62 is illuminated with illumination light (incident light $L_{IN}$) of a following vehicle. Then, the reflective layers 10 in the lug groove 60 can emit reflected light $L_{REF}$ toward a camera of the following vehicle, so that a recognition rate of the pneumatic tire 50 of a leading vehicle captured by the camera of the following vehicle can be improved. In addition, providing the reflective layer 10 in the lug groove 60 enables reflection characteristics of the reflective layer 10 to be maintained for a long period of time because the reflective layer 10 is less likely to be damaged when the tread surface is brought into contact with a foreign matter (a popping stone, scratching on a curb, or the like).

More preferably, the groove wall inclination angle θ4 is from 20 degrees to 50 degrees. When the pneumatic tire 50 has a designated rotation direction, the reflective layer 10 may be provided only on a groove wall facing rearward in a travel direction of the pneumatic tire 50.

Preferably, the lug groove 60 has a portion with a ratio of groove depth/groove width (groove width in the tread surface) of less than 4 in the groove cross section in terms of increasing a recognition rate of the lug groove 60 as a feature point of the pneumatic tire.

Figure 10:
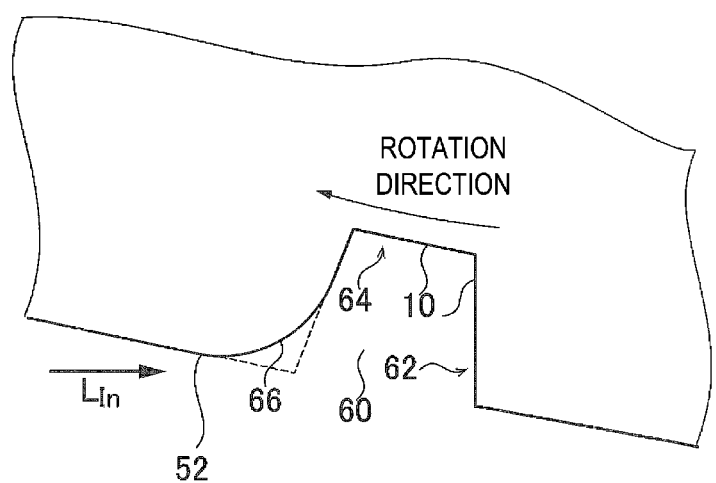
FIG. 10 is a diagram illustrating a placement of a reflective layer in yet another embodiment.

FIG. 10 is a diagram illustrating a placement of the reflective layer 10 in yet another preferred embodiment. In this case, preferably, a chamfer 66 is provided on a connecting portion between the sidewall 62 of the lug groove 60, positioned on a following vehicle side, and the tread surface 52, as illustrated in FIG. 10, to increase an area of a portion of the sidewall 62 illuminated with illumination light (incident light $L_{IN}$) of the following vehicle. The chamfer 66 may include a planar chamfer surface or a curved chamfer surface.

Figure 11:
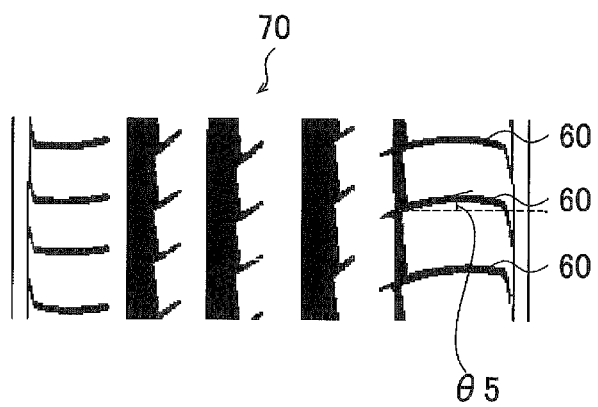
FIG. 11 is a diagram illustrating a placement of lug grooves in another embodiment.

FIG. 11 is a diagram illustrating a placement of lug grooves 60 in yet another embodiment. FIG. 11 illustrates a tread pattern 70 in which lug grooves 60 are provided in respective shoulder regions on opposite sides laterally outward of three circumferential main grooves. In plan view of the lug grooves 60, the lug grooves 60 each extend laterally and have a portion extending in a direction (a direction of extension of each of the lug grooves 60 at its center position in a groove width direction) inclined at a lug groove inclination angle θ5 of from 0 to 10 degrees from the tire lateral direction. The lug grooves 60 are each provided on its groove bottom and side walls with respective reflective layers. Preferably, the lug grooves 60 on opposite sides in the tire lateral direction are each provided with the reflective layers. As described above, the lug grooves 60 each include a portion inclined at a groove inclination angle θ5 of from 0 to 10 degrees, and the reflective layers are provided on the portion. This structure enables increasing an area of the portion with the reflective layers that can be recognized from a following vehicle even when the lug grooves 60 are each displaced to near the ground contact surface when the pneumatic tire rotates.

Figure 12:
FIG. 12 is a diagram illustrating a placement of lug grooves in yet another embodiment.

FIG. 12 is a diagram illustrating a placement of lug grooves 60 in yet another embodiment. According to the embodiment illustrated in FIG. 12, at least some of transparent globules 14 each include an opaque metallic reflective film formed along a part of a surface of the corresponding one of the transparent globules 14. For example, the metallic opaque reflective film 18 described above is used. Preferably, a distance between centers of the respective lug grooves 60 adjacent to each other in the tire circumferential direction (a distance between centers of the respective grooves in the width direction) of the plurality of lug grooves 60 disposed at intervals along the tire circumferential direction is an integral multiple of from 1.95 to 1.96 mm, and that the reflective layer 10 including the transparent globules 14 each with the opaque metallic reflective film is provided on the groove bottom or the side walls of each of the lug grooves 60.

Providing the reflective layer 10 in each of the lug grooves 60 as described above enables improving the estimated accuracy of the distance between vehicles using the pneumatic tire 50 in the collision avoidance system as compared to conventional tires. While in each of the embodiments described above, the collision avoidance system estimates a distance between vehicles from images obtained by a camera of a following vehicle, the collision avoidance system can also estimate a distance between vehicles using a radar sensor that receives a reflection wave of an electromagnetic wave transmitted toward the reflective layer 10 in addition to estimating a distance between vehicles using the camera. When a distance between vehicles is estimated using a reflection wave of an electromagnetic wave as described above, the reflection wave of the electromagnetic wave reflected by one reflective layer 10 provided in the lug groove 60 is so faint that it is difficult to estimate the distance between vehicles. However, a recognition rate of the lug grooves 60 can be improved by using sight in which the plurality of lug grooves 60 near the tire ground contact surface seems to be densely spaced as in a region F illustrated in FIG. 12 as viewed from a following vehicle.

Specifically, millimeter wave radar is widely used for a radar sensor to measure a distance between vehicles of a collision avoidance system using an electromagnetic wave. This electromagnetic wave is transmitted from a following vehicle, and a reflection wave thereof is received by an antenna of the following vehicle. At this time, when Bragg conditions based on Bragg law (Bragg scattering) are satisfied, many reflected waves each have the same phase to form a synthetic wave with a large amplitude. When the conditions as described above are satisfied, a distance d between centers of the respective lug grooves 60 adjacent to each other in the tire circumferential direction (a distance between centers of the respective grooves in the width direction) can be expressed as follows: $d = n \cdot \lambda / (2 \cdot \sin(90 - \varphi))$, where "n" is an integer equal to or greater than one, "λ" is a wavelength of millimeter waves, and "φ" is an angle of depression of the antenna with respect to the ground contact surface. In a collision avoidance system using an antenna for millimeter waves, the wavelength λ is about 3.9 mm (76 to 77 GHz), and the angle of depression φ of the antenna is from about 0.2 to 1.7 degrees when the antenna has a height of from 60 to 180 cm from a road surface in consideration of measuring a vehicle-to-vehicle distance of a leading vehicle that is from 20 m to 200 m ahead. Thus, the following results are acquired: $\sin(90-\varphi) \approx 1$; and $d \approx n \cdot \lambda / 2$. As a result, "d" is an integer multiple of from 1.95 to 1.96 mm.

Thus, a distance between centers of the respective lug grooves 60 adjacent to each other (a distance between centers of the respective grooves in the width direction) is preferably an integer multiple of from 1.95 to 1.96 mm. More preferably, even when a tread pattern has a variable pitch, "d" is an integer multiple of from 1.95 to 1.96 mm throughout the entire circumference of a tire.

While the pneumatic tire according to each of the embodiments of the present technology is described in detail above, the present technology is not limited to the above embodiments, and various improvements and modifications are available within a range without departing from the essence of the present technology as a matter of course.

The invention claimed is:
1. A pneumatic tire comprising:
a reflective layer that is provided on a surface of the pneumatic tire and that reflects light,
the reflective layer including:
a transparent globule group composed of a plurality of transparent globules,
at least some of the transparent globules of the transparent globule group being each configured to reflect incident light incident thereinto from outside, at an interface with the outside thereof, and to emit the light to the outside of the transparent globule as reflected light,
the transparent globules including a plurality of transparent globules A,
the transparent globules A being each configured to cause the reflected light to include more amount of non-retroreflected light than retroreflected light, the non-retroreflected light being farther away from an optical path of the incident light according to a distance from the transparent globule A being increased,
in a distribution of light amount of the reflected light in accordance with an angle difference between an optical path of the incident light and an optical path of the reflected light, the transparent globule A including a portion where a value of the light amount of the reflected light is more than a value of the light amount of light with an angle difference of zero, and the transparent globules A each have an optical path of the non-retroreflected light with an angle difference of from 2.0 degrees to 2.5 degrees from the optical path of the incident light.

2. The pneumatic tire according to claim 1, wherein the transparent globules A each have characteristics in which a value of a mean amount of the non-retroreflected light within a range of the angle difference of from 2.0 degrees to 2.5 degrees is more than a value of light amount of the retroreflected light.

3. The pneumatic tire according to claim 1, wherein the transparent globules A each have an opaque reflective film formed along a part of a surface of a corresponding one of the transparent globules A.

4. The pneumatic tire according to claim 3, wherein the opaque reflective film has an area that is from 30% to 70% of a total area of the surface of each of the transparent globules A.

5. The pneumatic tire according to claim 3, wherein an orientation of a central position of the opaque reflective film with respect to a center of each of the transparent globules A is dispersed among the transparent globules A.

6. The pneumatic tire according to claim 1, wherein
the reflective layer includes an opaque rubber layer that holds each of the transparent globules, and
each of the transparent globules has a portion corresponding to a length that is from 20 to 60% of a diameter of each of the transparent globules, the portion projecting from the opaque rubber layer.

7. The pneumatic tire according to claim 6, wherein the portion of each of the transparent globules, projecting from the opaque rubber layer, is covered with a transparent protective layer.

8. The pneumatic tire according to claim 1, wherein the transparent globules each have a diameter of from 10 to 250 μm.

9. The pneumatic tire according to claim 1, wherein
in a profile cross section of the pneumatic tire, an inclined region is positioned outward of a tread surface in a tire lateral direction and inclined in the tire lateral direction between the tread surface and a sidewall, the inclined region including an inclined surface with a gentle inclined surface that is closer to a direction parallel to the tire lateral direction than its surrounding portion, and the surrounding portion including on the inclined region a tread surface side portion that is located on a side of the tread surface with respect to the gentle inclined surface, and
the gentle inclined surface includes the reflective layer.

10. The pneumatic tire according to claim 1, wherein
a tread surface of the pneumatic tire includes lug grooves extending in a tire lateral direction,
the lug grooves each have a groove wall with an inclination angle of from 15 degrees to 55 degrees relative to a tire radial direction, and
the reflective layer is provided on a groove bottom of the lug groove and the groove wall.

11. The pneumatic tire according to claim 1, wherein
a tread surface of the pneumatic tire includes lug grooves extending in a tire lateral direction,
the lug grooves each have a portion in an extending direction of the lug grooves, the portion having a lug groove inclination angle of from 0 to 10 degrees from the tire lateral direction, and
the reflective layer is provided on a groove bottom and a groove wall in the portion of each of the lug grooves.

12. The pneumatic tire according to claim 11, wherein
the lug grooves each have the groove wall with an inclination angle of from 15 degrees to 55 degrees relative to a tire radial direction, and
the reflective layer is provided on the groove bottom and the groove wall of each of the lug grooves.

13. The pneumatic tire according to claim 1, wherein
at least some of the transparent globules each include an opaque metallic reflective film in a part of its surface, being formed along the surface,
a tread surface of the pneumatic tire includes a plurality of lug grooves extending in a tire lateral direction, disposed along a tire circumferential direction,
a distance between centers of the lug grooves adjacent to each other in the tire circumferential direction is an integer multiple of from 1.95 to 1.96 mm, and
the reflective layer is provided on a groove bottom or a groove wall of each of the lug grooves.

14. A pneumatic tire comprising:
a reflective layer that is provided on a surface of the pneumatic Lire and that reflects light,
the reflective layer including:
a transparent globule group composed of a plurality of transparent globules,
at least some of the transparent globules of the transparent globule group being each configured to reflect incident light incident thereinto from outside, at an interface with the outside therefore, and to emit the light to the outside of the transparent globule as reflected light,
the transparent globules including a plurality of transparent globules A,
the transparent globules A being each configured to cause the reflected light to include more amount of non-retroreflected light than retroreflected light, the non-retroreflected light being farther away from an optical path of the incident light according to a distance from the transparent globule A being increased, and
the transparent globules A each have an optical path of the non-retroreflected light with an angle difference of from 2.0 degrees to 2.5 degrees from the optical path of the incident light,
wherein the transparent globule group includes a plurality of transparent globules B each having the angle difference less than that of each of the transparent globules A.

15. The pneumatic tire according to claim 14, wherein a ratio of a number of the transparent globules A to a total number of the transparent globules A and the transparent globules B is from 30% to 70%.

16. A pneumatic tire comprising:
a reflective layer that is provided on a surface of the pneumatic tire and that reflects light,
the reflective layer including:
a transparent globule group composed of a plurality of transparent globules,
at least some of the transparent globules of the transparent globule group being each configured to reflect incident light incident thereinto from outside, at an interface with the outside thereof, and to emit the light to the outside of the transparent globule as reflected light,
the transparent globules including a plurality of transparent globules A,
the transparent globules A being each configured to cause the reflected light to include more amount of non-retroreflected light than retroreflected light, the non-retroreflected light being farther away from an optical path of the incident light according to a distance from the transparent globule A being increased, and the transparent globules A each have an optical path of the non-retroreflected light with an angle difference of from 2.0 degrees to 2.5 degrees from the optical path of the incident light, wherein the reflective layer includes a transparent protective layer inside which the transparent globule group is distributed, and the transparent globule group includes transparent globules C each having an entirely transparent surface, a number of the transparent globules C being from 5 to 50% of a total number of transparent globules of the transparent globule group.

\* \* \* \* \*